United States Patent [19]

Breon et al.

[11] Patent Number: 4,894,047
[45] Date of Patent: Jan. 16, 1990

[54] RETAINING CAGE FOR CHECK-VALVES AND SLACK ADJUSTERS USING SAME

[75] Inventors: Mark S. Breon; Leslie L. Ecklund, both of Battle Creek, Mich.

[73] Assignee: Eaton Corporation, Cleveland, Ohio

[21] Appl. No.: 343,232

[22] Filed: Apr. 26, 1989

[51] Int. Cl.[4] .............................................. F16H 7/08
[52] U.S. Cl. ..................................... 474/110; 474/138
[58] Field of Search ............... 474/101, 113, 109–111, 474/133–138

[56] References Cited

U.S. PATENT DOCUMENTS

| | | | |
|---|---|---|---|
| 4,674,996 | 6/1987 | Anno et al. | 474/110 |
| 4,708,696 | 11/1987 | Kimura et al. | 474/138 X |
| 4,790,796 | 12/1988 | Okabe et al. | 474/110 |

Primary Examiner—Thuy M. Bui
Attorney, Agent, or Firm—A. E. Chrow

[57] ABSTRACT

A resilient cage (100) is provided for retaining a check-valve (56) in registration with a passageway (54) through an end wall of the static plunger (48) for controlling fluid flow from a first fluid chamber (50) into a second fluid chamber (60). Static plunger (48) includes an annular groove (52) in its outer surface proximate the end wall and cage (100) includes a radially inwardly extending flange (6) that is adapted to extend into groove (52) and secure cage (100) in the manner of an end cap about the end of static plunger (48). Cage (100) also serves to retain static plunger (48) together with a dynamic plunger (28) containing chamber (60) against the force of a spring (64) tending to separate plungers (28 and 48) after assembly.

22 Claims, 1 Drawing Sheet

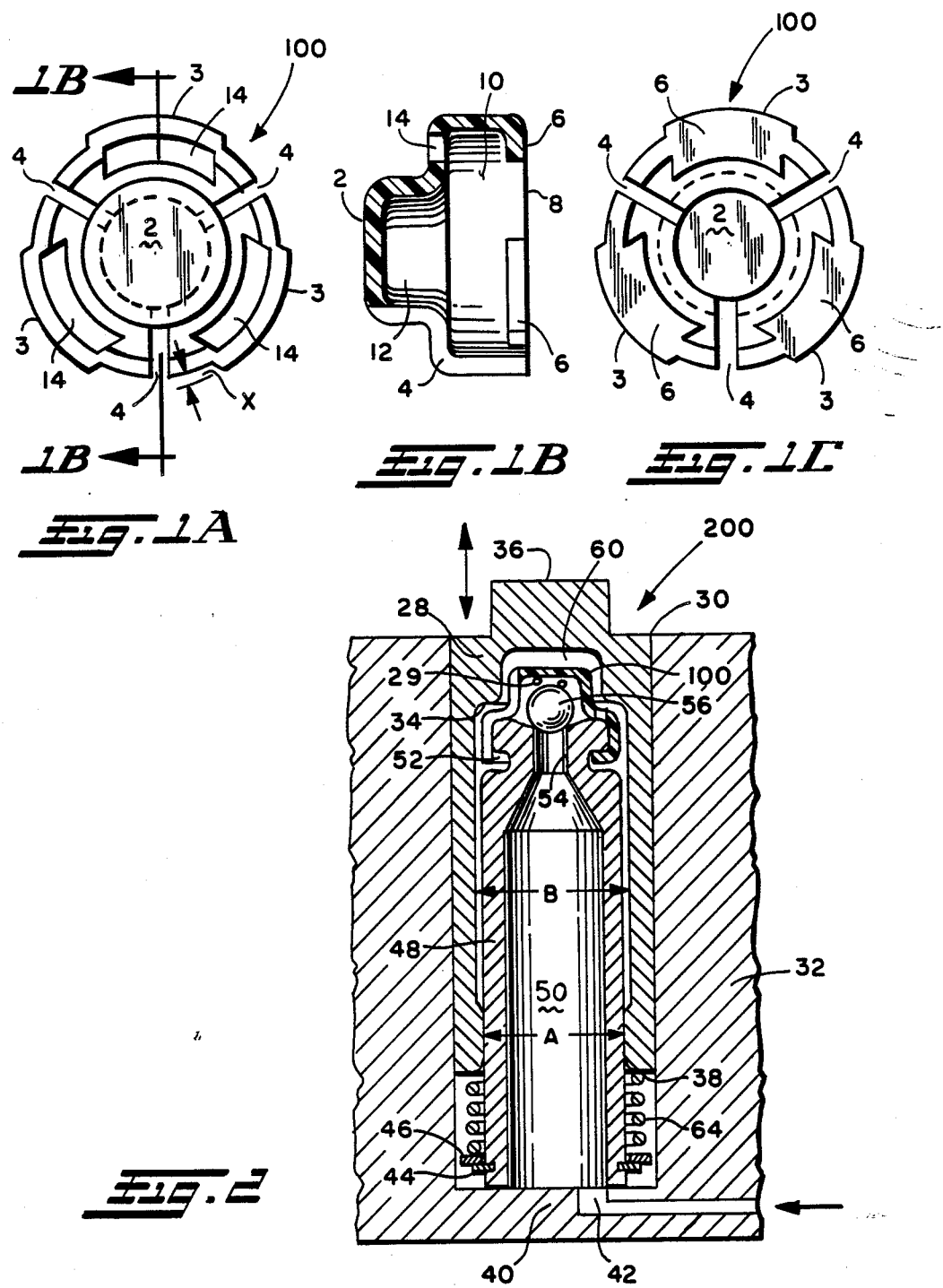

RETAINING CAGE FOR CHECK-VALVES AND SLACK ADJUSTERS USING SAME

INTRODUCTION

This invention relates generally to a cage for holding a check-valve in a fluid operated device and more particularly to a check-valve retaining cage in the form of a resilient hollow end-cap that is inexpensive to manufacture, easy to install, and highly effective in controlling fluid flow in a fluid operated slack adjusting device such as a lash-adjuster or belt or chain tensioning device for a vehicular engine.

BACKGROUND OF THE INVENTION

Cages have been used for many years to hold check-valves in registration with fluid passageways for controlling the flow of fluid, commonly pressurized fluid, therethrough.

Fluid operative devices, particularly slack adjusting devices, have employed such cages for many years for enabling a check-valve to control pressurized fluid flow to assist movement of a spring biased piston for a vehicular engine slack adjuster or chain or belt tensioner well known to those skilled in the art.

The cages heretofor used in such devices have most commonly been held in place by featuring circular outwardly extending flanges that are adapted to rest in a recess surrounding the passageway for the fluid and are held thereagainst by means of a coiled spring.

Examples of prior art check-valve cages employing such means to hold the cages in place in slack adjusting devices are disclosed in U.S. Pat. Nos. 4,098,240; 4,184,464; and 4,227,495, and examples employing such means for holding the cages in place in chain or belt tensioning devices are disclosed in U.S. Pat. Nos. 4,507,103; 4,713,044; and 4,708,696, the disclosures of all of which are incorporated herein by reference.

In other instances, the cages have been held in place by having a peripheral edge that extends radially outwardly into a surrounding inwardly facing groove adapted to hold the cage in place and which in some instances, has employed a retaining clip to hold the edge in the groove.

The cage of the present invention, while providing the function of holding a check-valve in registration with a passageway for controlling fluid flow therethrough between two chambers, is held in place in an entirely different manner enabling elimination of the coiled spring and inwardly facing groove and/or retaining clip heretofor used for such purpose.

The present invention not only provides a resilient cage for retaining a check-valve for controlling fluid flow through a passageway between two chambers, but additionally provides a convenient method for holding two plungers together containing the respective chambers against a resilient biasing means, such as a spring, tending to separate the plungers.

SUMMARY OF THE INVENTION

Accordingly, it is an object of this invention to provide a cage for holding a check-valve in registration with a passageway between first and second fluid chambers for controlling fluid flow therebetween.

It is another object of this invention to provide a resilient cage for holding a check-valve in registration with a fluid passageway that is held in position in a simple manner and eliminates a coiled spring and other devices heretofor used for such purpose.

It is yet another object of this invention to provide a fluid operated slack adjusting device, such as vehicular engine lash adjuster or chain or belt tensioner, that employs a resilient cage for holding a check-valve in registration with a fluid passageway that is held in position in a simple manner by eliminating the coiled springs and other devices heretofore used for such purpose.

It is still another object of this invention to provide a resilient check-valve cage that is additionally operative to hold two plungers together containing respective chambers between which fluid flow is being controlled by the check-valve.

BRIEF DESCRIPTION OF THE DRAWINGS

FIG. 1A is a top view of a preferred embodiment of a check-valve the invention;

FIG. 1B is a central cross-section of the cage of FIG. 1 taken view line 1B—1B;

FIG. 1C is a bottom view of the cage of FIG. 1A; and

FIG. 2 is a central cross-section view of an embodiment of a fluid operated slack adjusting device using the cage of FIGS. 1A–1C.

DESCRIPTION OF SOME PREFERRED EMBODIMENTS

In FIGS. 1A–1C, cage 100 of the present invention has a cup-like configuration in the form of a hollow end-cap.

Cage 100 has a bore having a circular entrance-way 8 thereinto adjacent a first cavity 10 therewithin. Entrance-way 8 is surrounded by a flange 6 that extends radially inwardly theretowards. Although flange 6 may be continuous about entrance-way 8, it is preferably divided into three circumferentially spaced arcuate segments as hereinafter described.

The opposite side of cavity 10 communicates with a second cavity 12 within a cage 100 that is aligned substantially concentrically with and is smaller than cavity 10. Cavity 10 is adapted to receive an end portion of a cylindrical static plunger member 48 hereinafter described with respect to FIG. 2. Cavity 12 is adapted to contain and hold a check-valve in registration with a fluid passageway through an end wall of the member 48 as hereinafter described also with respect to FIG. 2.

Cage 100 has a central end section 2 disposed in overhanging relationship to cavity 12 and also has at least one aperture for enabling fluid to flow between two chambers as hereinafter described.

More particularly cage 100 includes at least one aperture, preferably in the form of at least two slots 4, for enabling fluid flow therethrough that are substantially circumferentially evenly spaced and extend radially outwardly from section 2 for a distance sufficient to bisect cage 100 into at least two segments joined together at one end by central section 2. Cage 100 preferably includes three slots 4 dividing it into three segments as shown in FIGS. 1A and 1C.

Cage 100 includes at least one aperture 14 therethrough enabling fluid to flow between chambers therethrough having a fluid passageway therebetween being controlled by a check-valve being held in registration therewith by cage 100. Preferably, each segment has an elongate aperture 14 therethrough that extends circumferentially between and is in substantial transverse relationship to slots 4 as shown in FIGS. 1A and 1C.

Although the outer periphery of the base of cage 100 may be circular, it is preferably stepped by having a prescribed region on opposite sides of slots 4 having a radial length less than the radius of the base by a prescribed distance "X". Such is of particular advantage for it provides circumferentially spaced-apart arcuate lips 3 that extend radially outwardly from the base of cage 100 and are operative to flex to enable cage 100 to be inserted through the opening in the lower end of bore 34 in dynamic plunger 28 shown in FIG. 2 having reduced diameter A and then straighten within the portion of bore 34 having larger diameter B and hold static plungers 28 and 48 together against the force of spring 64 as shown in FIG. 2.

Cage 100 is made from a resilient material suitable for the particular application and environment involved of which a suitably resilient nylon has been found to be particularly advantageous.

FIG. 2 shows a slack adjusting device 200 using cage 100 to hold a check-valve 56 in registration with a passageway 54 between first fluid chamber 50 and second fluid chamber 60 for controlling fluid flow therebetween.

Device 200 has a dynamic plunger 28 reciprocally disposed in a bore 30 in a body member 32. Bore 30 has an open end into which plunger 28 is received and an opposite closed end 40.

Body member 32 may, for example, be an engine block where device 200 is a lash adjuster for adjusting lash of a cam follower or body member 32 may be a mountable member for mounting and orienting plunger 28 to enable it to maintain tension on a belt or a chain.

Plunger 28 has a bore 34 extending therethrough between an annular end 38 thereof facing in spaced-apart relationship to closed-end 40 of bore 30 and exposed end 36 thereof adapted to adjust slack as either a fluid operated lash adjuster or chain or belt tensioner in response to reciprocal movement of sleeve 28 as is well known to those skilled in the art.

A hollow, cylindrical, static plunger or member 48 is stationarily disposed in bore 34 with the upper portion thereof received into bore 34 of plunger 28 which is reciprocally movable relative stationery plunger 48.

The hollow interior of plunger 48 provides a first fluid chamber 50 therewithin commonly known as the fluid reservoir or low pressure chamber.

Means for holding static plunger 48 stationary in bore 30 whilst resiliently urging plunger 28 outwardly from bore 30 is preferably provided by means of a resilient member such as coiled spring 64 disposed between end 38 of plunger 28 and a flange 46 extending radially outwardly from stationery plunger 48 proximate closed end 40 of bore 30. Flange 46 may be in the form of a washer supported by a snap ring 44 or the like. Spring 38 is operable to urge plunger 28 outwardly from bore 30 whilst pressing against flange 46 and urging static plunger 48 against closed end 40 of bore 30.

Body member 32 includes means such as fluid passageway 42 for conveying pressurized fluid from a pressurized fluid source such as a vehicular oil pump into chamber 50 of static plunger 48.

The end wall of static plunger 48 facing towards exposed end 36 of dynamic plunger 28 is spaced-apart therefrom to define a second fluid chamber 60 (commonly known as the high pressure chamber) within bore 30 therebetween. A passageway 54 extends through the end wall to provide fluid communication between chambers 54 and 60.

A circular groove 52 is disposed in the outer surface of plunger 48 facing radially outwardly from passageway 54 proximate the end of plunger 48 facing towards chamber 60 and exposed end 36 of sleeve 28.

Inwardly extending flanges 6 (not referenced) of cage 100 are received into groove 52 to resiliently secure cage 100 as an end-cap about the end of plunger 48 between groove 52 and the surface of the end wall of plunger 48 facing towards chamber 60 received into first cavity 10 of cage 100.

A check-valve (preferably in the form of a spherical ball 56) is contained in second cavity 12 of cage 100 and held in substantial registration with the exit of passageway 54 into chamber 60.

The cylindrical portion of plunger 48 between groove 52 and the end wall of plunger 48 intermediate chambers 50 and 60 preferably has a smaller diameter than the rest of plunger 48 to provide clearance for that portion of cage 100 that extends beyond the outer surface of plunger 48 and the bore of plunger 28. Although check-valve 56 preferably floats freely within second cavity 12 and operates to open or close passageway 54 according to the pressure differential thereacross, at least two ways may additionally be employed to enable cage 100 to assist in urging check-valve 56 against passageway 54 to prevent fluid from flowing from chamber 50 into chamber 60 when fluid pressure in chamber 60 exceeds that in chamber 50 by a prescribed amount and to release check-valve 56 from passageway 54 to enable fluid to flow from chamber 50 into chamber 60 when fluid pressure in chamber 50 exceeds that in chamber 60 by a prescribed amount.

One way is for central section 2 of cage 100 to engage check-valve 56 and be made from a material having a resiliency operable to cause check-valve 56 to operate in the manner described above in response to the fluid pressure differential between chambers 50 and 60.

Another way is to include a resilient biasing member such as coiled spring 29 between central section 2 of cage 100 and check-valve 56 that in conjunction with resilient cage 100 is operable to control movement of check-valve 56 in the manner hereinbefore described.

The operation of device 200 is well known to those skilled in the art and is not reproduced here in detail except to the extent that the object being acted upon by exposed end 36 of sleeve 28 exerts a force thereagainst which is counteracted upon by the force of spring 64 allows the unit to capitalize upon the incompressibility of fluid such as oil in a manner that is well known to those skilled in fluid operated slace adjuster art.

What is claimed is:

1. A cage for holding a check-valve in registration with a passageway through an end wall of a substantially cylindrical member separating a pair of fluid chambers for controlling fluid flow therebetween, said cylindrical member having a groove in the outer surface thereof facing radially outwardly away from the passageway in proximity to the end wall, said cage configured in the form of a hollow end-cap having a base having an entrance-way thereinto surrounded by a flange extending radially inwardly theretowards and operative to extend into the groove and resiliently secure the cage thereto, said cage having a first cavity therewithin adjacent the entrance-way that is adapted to receive thereinto the cylindrical member between the end wall and the groove, said cage having a second cavity therewithin that communicates with the first cavity on the opposite side thereof from the entrance-way thereinto and is smaller than the first cavity and aligned substantially concentrically therewith and operative to receive the check-valve thereinto and hold the check-valve in registration with the passageway, said cage having at least one aperture adapted to enable the fluid to flow between the chambers therethrough, and said cage operable to enable the check-valve against the passageway to prevent the fluid from flowing from one chamber into the other chamber when the fluid pressure in the other chamber exceeds the fluid pressure in said one chamber by a prescribed amount and to enable the check-valve to release from the passageway sufficiently to enable the fluid to flow from one said chamber into the other chamber when the fluid pressure in said chamber exceeds the fluid pressure in the other chamber by a prescribed amount.

2. The cage of claim 1 including at least two substantially evenly circumferentially spaced slots extending therethrough radially outwardly from a central section thereof disposed in overhanging relationship to the second cavity for a distance sufficient to provide at least two segments joined together at one end by the central section.

3. The cage of claim 2 having three of the slots providing three segments joined together at one end by the central section.

4. The cage of claim 2 or 3 including an aperture through at least one of the segments for enhancing fluid flow between the chambers.

5. The cage of claim 4 wherein the aperture is an elongate aperture extending circumferentially along the segment in substantial transverse relationship to the slots.

6. The cage of claim 2 wherein the central section engages the check-valve within the second cavity and is operative to resiliently urge the check-valve against the passageway.

7. The cage of claim 2 including a resilient member disposed between and engaging both the check-valve and the central section within the second cavity and operative to resiliently urge the check-valve against the passageway.

8. The cage of claim 7 wherein the resilient member is a coiled spring.

9. The cage of claim 1 wherein a section of the cage is disposed in overhanging relationship to the second cavity is engaged with and operative to resiliently urge the check-valve against the passageway.

10. The cage of claim 1 including a flange extending radially outwardly from the base thereof.

11. The cage of claim 10 wherein the flange comprises a plurality of circumferentially spaced arcuate lips.

12. A fluid operated slack adjusting device comprising;
a body member having a bore therein having an open end and a closed end;
a dynamic plunger having at least a portion thereof disposed in the body member bore, said plunger reciprocally movable relative the body member bore and having an exposed end and having an opposite end having an open-ended bore therein in spaced-apart facing relationship with the body member bore closed end,
a substantially cylindrical static plunger stationarily disposed within the body member bore, said static plunger having a hollow interior defining a first fluid chamber therewithin and having a portion thereof extending into the dynamic plunger bore and ending in a closed end facing away from the body member bore closed end that is in spaced-apart facing relationship with the exposed end of the dynamic plunger defining a second fluid chamber therebetween,
means disposed within the body member bore for holding the static plunger stationary relative thereto whilst urging the dynamic plunger outwardly therefrom to enable the exposed end thereof to adjust slack,
means for conveying pressurized fluid through the body member into the first chamber,
a passageway extending through the static plunger closed end providing fluid communication between the first and second fluid chambers,
an annular groove in the outer surface of the static plunger facing radially outwardly away from the passageway is proximity to the end of the static plunger facing towards the exposed end of the dynamic plunger and,
a cage operative to hold a check-valve in registration with the passageway between the first and second fluid chambers for controlling fluid flow therebetween, said cage configured in the form of a hollow end-cap having a base having an entrance-way thereinto surrounded by a flange extending radially inwardly theretowards and operative to extend into the static plunger groove and resiliently secure the cage thereto, said cage having a first cavity therewithin adjacent the entrance-way adapted to receive thereinto the portion of the static plunger between the groove and the end thereof facing towards the exposed end of the dynamic plunger, said cage having a second cavity therewithin that communicates with the first cavity on the opposite side thereof from the entrance-way and is smaller than the first cavity and aligned substantially concentrically therewith and operative to receive the check-valve thereinto and hold the check-valve in registration with the passageway, said cage having at least one aperture enabling fluid to flow between chambers therethrough, and said cage operable to enable the check valve to move against the passageway to prevent the fluid from flowing from the first chamber into the second chamber when the fluid pressure in the second chamber exceeds the fluid pressure in the first chamber by a prescribed amount and to enable the check-valve to release from the passageway to enable fluid to flow from the second chamber when the fluid pressure in the first chamber exceeds the fluid pressure in the second chamber by a prescribed amount.

13. The device of claim 12 wherein the cage includes at least two substantially evenly circumferentially spaced slots extending therethrough radially outwardly from a central section thereof disposed in overhanging relationship to the second cavity for a distance sufficient to divide the cage into at least two segments joined together in one end by the central section.

14. The device of claim 13 having three of the slots dividing the cage into three segments joined together at an end by the central section.

15. The device of claim 13 or 14 including an aperture through at least one of the segments for enhancing the fluid flow between the first and second fluid chambers.

16. The device of claim 15 wherein the aperture is an elongate aperture extending circumferentially and in substantial transverse relationship to the slots.

17. The device of claim 12 wherein a section of the cage overhanging the passageway is engaged with and is operative to resiliently urge the check-valve against the passageway.

18. The device of claim 12 including a resilient biasing member disposed intermediate the check-valve and a section of the cage overhanging the passageway and is operative to urge the check-valve thereagainst.

19. The device of claim 18 wherein the biasing member is a coiled spring.

20. The device of claim 12 wherein the means disposed within the body member bore for holding the static plunger stationary relative thereto is provided by said static plunger including a flange extending radially outwardly therefrom within the body member bore proximate the closed end thereof and a coiled spring disposed about the static plunger and having one end engaging the flange and an opposite end engaging the dynamic plunger and operative to move the dynamic plunger outwardly from the body member bore whilst holding the static plunger against the closed end thereof.

21. The device of claim 12 wherein the static plunger bore has a smaller diameter section and a larger diameter section with the small diameter section adjacent the open end thereof and the cage includes a flange extending radially outwardly from the base thereof for a distance sufficient to enable the flange to flex and enable the cage to be inserted through the small diameter section and then straighten within the larger diameter section sufficiently to hold the static plunger within the sleeve bore.

22. The device of claim 21 wherein the flange comprises a plurality of circumferentially spaced arcuate lips.

* * * * *